US012595528B2

(12) United States Patent
Kwon et al.

(10) Patent No.: US 12,595,528 B2
(45) Date of Patent: Apr. 7, 2026

(54) GRAIN-ORIENTED ELECTRICAL STEEL SHEET AND METHOD FOR REFINING MAGNETIC DOMAIN OF SAME

(71) Applicant: POSCO, Pohang-si (KR)

(72) Inventors: Oh-Yeoul Kwon, Pohang-si (KR); Jong-Tae Park, Pohang-si (KR); Woo-Sin Kim, Pohang-si (KR); Chang-Ho Kim, Pohang-si (KR); Hyun-Chul Park, Pohang-si (KR); Won-Gul Lee, Pohang-si (KR); Oho-Cheal Kwon, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 146 days.

(21) Appl. No.: 17/272,094

(22) PCT Filed: May 23, 2019

(86) PCT No.: PCT/KR2019/006218
§ 371 (c)(1),
(2) Date: Feb. 26, 2021

(87) PCT Pub. No.: WO2020/045796
PCT Pub. Date: Mar. 5, 2020

(65) Prior Publication Data

US 2021/0317545 A1 Oct. 14, 2021

(30) Foreign Application Priority Data

Aug. 28, 2018 (KR) ........................ 10-2018-0101596

(51) Int. Cl.
*C21D 10/00* (2006.01)
*C21D 8/12* (2006.01)
(Continued)

(52) U.S. Cl.
CPC ......... *C21D 10/005* (2013.01); *C21D 8/1222* (2013.01); *C21D 8/1233* (2013.01);
(Continued)

(58) Field of Classification Search
None
See application file for complete search history.

(56) References Cited

U.S. PATENT DOCUMENTS 4,293,350 A * 10/1981 Ichiyama ............... C21D 10/00
148/120
5,665,455 A * 9/1997 Sato ..................... C21D 8/1294
148/306
(Continued)

FOREIGN PATENT DOCUMENTS

CN 1114687 A 1/1996
CN 107208229 A 9/2017
(Continued)

OTHER PUBLICATIONS

Machine Translation of WO-2016056501-A1 (Year: 2016).*
(Continued)

*Primary Examiner* — John A Hevey
(74) *Attorney, Agent, or Firm* — Morgan Lewis & Bockius LLP

(57) ABSTRACT

An embodiment of the present invention provides a grain-oriented electrical steel sheet, including: a linear groove formed in a direction crossing a rolling direction on one surface or both surfaces of an electrical steel sheet; and a linear thermal shock portion formed in the direction crossing the rolling direction on one surface or both surfaces of the electrical steel sheet. The groove is formed in plural along the rolling direction, a distance D2 between the groove and the thermal shock portion is 0.2 to 0.5 times a distance D1 between the grooves, and a distance D3 between the thermal
(Continued)

shock portions is 0.2 to 3.0 times the distance D1 between the grooves.

10 Claims, 6 Drawing Sheets

(51) Int. Cl.

| | |
|---|---|
| ***C21D 8/1216*** | (2026.01) |
| ***C21D 8/1277*** | (2026.01) |
| ***C22C 38/00*** | (2006.01) |
| ***C23C 22/20*** | (2006.01) |
| ***C23C 22/22*** | (2006.01) |
| ***H01F 1/18*** | (2006.01) |

(52) U.S. Cl.

CPC ............ *C21D 8/1283* (2013.01); *C22C 38/00* (2013.01); *C23C 22/20* (2013.01); *C23C 22/22* (2013.01); *H01F 1/18* (2013.01); *C21D 2201/05* (2013.01)

(56) References Cited

U.S. PATENT DOCUMENTS

| | | | | |
|---|---|---|---|---|
| 2013/0206283 | A1* | 8/2013 | Inoue | C21D 8/1277 148/306 |
| 2015/0248957 | A1* | 9/2015 | Takajo | C22C 38/002 148/112 |
| 2017/0182591 | A1* | 6/2017 | Arai | C22C 38/02 |
| 2017/0263357 | A1* | 9/2017 | Senda | C22C 38/00 |
| 2017/0298467 | A1* | 10/2017 | Suehiro | C21D 8/005 |
| 2018/0030559 | A1 | 2/2018 | Uesaka et al. | |

FOREIGN PATENT DOCUMENTS

| | | | | |
|---|---|---|---|---|
| JP | S59-057333 A | | 4/1984 | |
| JP | H05-304016 A | | 11/1993 | |
| JP | H07-201550 A | | 8/1995 | |
| JP | H07-258739 A | | 10/1995 | |
| JP | H07-316655 A | | 12/1995 | |
| JP | H07-320922 A | | 12/1995 | |
| JP | 2000-109961 A | | 4/2000 | |
| JP | 2003-129135 A | | 5/2003 | |
| JP | 2005-336529 A | | 12/2005 | |
| JP | 0992591 B1 | * | 8/2009 | B23K 26/0619 |
| JP | 2012-012639 A | | 1/2012 | |
| KR | 10-0259990 B1 | | 6/2000 | |
| KR | 10-2013-0128214 A | | 11/2013 | |
| KR | 10-2014-0087144 A | | 7/2014 | |
| KR | 10-2014-0109409 A | | 9/2014 | |
| KR | 20150012205 A | * | 2/2015 | C21D 8/1294 |
| KR | 10-2016-0019919 A | | 2/2016 | |
| KR | 10-2016-0078247 A | | 7/2016 | |
| KR | 10-2017-0106449 A | | 9/2017 | |
| KR | 10-2018-0073306 A | | 7/2018 | |
| KR | 10-2018-0074131 A | | 7/2018 | |
| KR | 10-2019-0078161 A | | 7/2019 | |
| WO | 2004/083465 A1 | | 9/2004 | |
| WO | WO-2016056501 A1 | * | 4/2016 | C21D 8/005 |

OTHER PUBLICATIONS

Machine Translation of EP-0992591-B1 (Year: 2015).*

Machine Translation of KR-20150012205-A (Year: 2015).*

Extended European Search Report dated Oct. 7, 2021 issued in European Patent Application No. 19855807.4.

International Written Opinion and Search Report dated Aug. 28, 2019 issued in International Patent Application No. PCT/KR2019/006218 (partial English translation).

Japanese Office Action dated Apr. 5, 2022 issued in Japanese Patent Application No. 2021-510815.

Chinese Office Action dated Feb. 17, 2022 issued in Chinese Patent Application No. 201980057188.4.

Chinese Search Report dated Feb. 11, 2022 issued in Chinese Patent Application No. 201980057188.4.

* cited by examiner

GRAIN-ORIENTED ELECTRICAL STEEL SHEET AND METHOD FOR REFINING MAGNETIC DOMAIN OF SAME

CROSS-REFERENCE OF RELATED APPLICATIONS

This application is the U.S. National Phase under 35 U.S.C. § 371 of International Patent Application No. PCT/KR2019/006218, filed on May 23, 2019, which in turn claims the benefit of Korean Application No. 10-2018-0101596, filed on Aug. 28, 2018, the entire disclosures of which applications are incorporated by reference herein.

TECHNICAL FIELD

Background Art

(a) Field of the Invention

The present invention relates to a grain-oriented electrical steel sheet and a method for refining a magnetic domain of the same. More specifically, it relates to a grain-oriented electrical steel sheet and a method for refining a magnetic domain of the same that may improve iron loss and simultaneously reduce thermal shock by combining a permanent magnetic domain refining method and a temporary magnetic domain refining method.

(b) Description of the Related Art

Since a grain-oriented electrical steel sheet is used as an iron core material of an electrical device such as a transformer, in order to improve energy conversion efficiency thereof by reducing power loss of the device, it is necessary to provide a steel sheet having excellent iron loss of the iron core material and a high occupying ratio when being stacked and spiral-wound.

The grain-oriented electrical steel sheet refers to a functional material having a texture (referred to as a "GOSS texture") of which a secondary-recrystallized grain is oriented with an azimuth {110}<001> in a rolling direction through a hot rolling process, a cold rolling process, and an annealing process.

As a method of reducing the iron loss of the grain-oriented electrical steel sheet, a magnetic domain refining method is known. In other words, it is a method of refining a large magnetic domain contained in a grain-oriented electrical steel sheet by scratching or energizing the magnetic domain. In this case, when the magnetic domain is magnetized and a direction thereof is changed, energy consumption may be reduced more than when the magnetic domain is large. The magnetic domain refining methods include a permanent magnetic domain refining method, which retains an improvement effect even after heat treatment, and a temporary magnetic domain refining method, which does not retain an improvement effect after heat treatment.

The permanent magnetic domain refining method in which iron loss is improved even after stress relaxation heat treatment at a heat treatment temperature or more at which recovery occurs may be classified into an etching method, a roll method, and a laser method. According to the etching method, since a groove is formed on a surface of a steel sheet through selective electrochemical reaction in a solution, it is difficult to control a shape of the groove, and it is difficult to uniformly secure iron loss characteristics of a final product in a width direction thereof. In addition, the etching method has a disadvantage that it is not environmentally friendly due to an acid solution used as a solvent.

The permanent magnetic domain refining method using a roll is a magnetic domain refining technology that provides an effect of improving iron loss that partially causes recrystallization at a bottom of a groove by forming the groove with a certain width and depth on a surface of a plate by pressing the roll or plate by a protrusion formed on the roll and then annealing it. The roll method is disadvantageous in stability in machine processing, in reliability due to difficulty in securing stable iron loss depending on a thickness, in process complexity, and in deterioration of the iron loss and magnetic flux density characteristics immediately after the groove formation (before the stress relaxation annealing).

The permanent magnetic domain refining method using a laser is a method in which a laser beam of high output is irradiated onto a surface portion of an electrical steel sheet moving at a high speed, and a groove accompanied by melting of a base portion is formed by the laser irradiation. However, these permanent magnetic domain refining methods also have difficulty in refining the magnetic domain to a minimum size.

Current technology of the temporary domain refining method does not focus on performing coating once again after irritating the laser in a coated state, and thus, the laser is not attempted to be irradiated with a predetermined intensity or higher. This is because when the laser is irradiated with a predetermined intensity or higher, it is difficult to properly obtain a tension effect due to damage to the coating.

Since the permanent magnetic domain refining method is to increase a free charge area that may receive static magnetic energy by forming a groove, a deep groove depth is required as much as possible. In addition, a side effect such as a decrease in magnetic flux density also occurs due to the deep groove depth. Therefore, in order to reduce the magnetic flux density deterioration, the groove is managed with an appropriate depth.

DISCLOSURE

A grain-oriented electrical steel sheet and a magnetic domain refining method therefor are provided. Specifically, it is an object to provide a grain-oriented electrical steel sheet and a magnetic domain refining method therefor that may improve iron loss and simultaneously reduce thermal shock by combining a permanent magnetic domain refining method and a temporary magnetic domain refining method.

An embodiment of the present invention provides a grain-oriented electrical steel sheet, including: a linear groove formed in a direction crossing a rolling direction on one surface or both surfaces of an electrical steel sheet; and a linear thermal shock portion formed in the direction crossing the rolling direction on one surface or both surfaces of the electrical steel sheet.

The groove and the thermal shock portion are formed in plural along the rolling direction, and a distance D2 between the groove and the thermal shock portion is 0.2 to 0.5 times a distance D1 between the grooves.

The distance D3 between the thermal shock portions is 0.2 to 3.0 times the distance D1 between the grooves.

The distance D1 between the grooves may be 2 to 15 mm, the distance D2 between the groove and the thermal shock portion may be 0.45 to 7.5 mm, and the distance D3 between the thermal shock portions may be 2.5 to 25 mm.

The groove and the thermal shock portion may be formed on one surface of a steel sheet.

The groove may be formed on one surface of a steel sheet, and the thermal shock portion may be formed on the other surface of the steel sheet.

The distance D3 between the thermal shock portions may be 0.2 to 0.4 times the distance D1 between the grooves.

The distance D3 between the thermal shock portions may be 2 to 2.8 times the distance D1 between the grooves.

A depth of the groove may be 3 to 5% of a thickness of the steel sheet.

The thermal shock portion may have a difference in Vickers hardness (HV) of 10 to 120 from a surface of the steel sheet in which the thermal shock portion is not formed.

A solidified alloy layer formed at a lower portion of the groove may be included, and the solidified alloy layer may have a thickness of 0.1 μm to 3 μm.

An insulation coating layer formed at an upper portion of the groove may be included.

A length direction and the rolling direction of the groove and the thermal shock portion may form an angle of 75 to 88°.

The groove and the thermal shock portion may be intermittently formed at 2 to 10 along a rolling vertical direction of the steel sheet.

Another embodiment of the present invention provides a magnetic domain refining method of a grain-oriented electrical steel sheet, including: preparing a grain-oriented electrical steel sheet; forming a linear groove by irradiating a laser on one surface or both surfaces of the grain-oriented electrical steel sheet in a direction crossing a rolling direction: and forming a linear thermal shock portion by irradiating a laser on one surface or both surfaces of the grain-oriented electrical steel sheet in the direction crossing the rolling direction.

A plurality of the grooves and the thermal shock portions are formed along the rolling direction by performing the forming of the groove and the forming of the thermal shock portion in plural; and a distance D2 between the groove and the thermal shock portion is 0.2 to 0.5 times a distance D1 between the plurality of the grooves, while a distance D3 between the thermal shock portions is 0.2 to 3.0 times the distance D1 between the grooves.

In the forming of the groove, an energy density of the laser may be 0.5 to 2 $J/mm^2$, and in the forming of the thermal shock portion, an energy density of the laser may be 0.02 to 0.2 $J/mm^2$.

In the forming of the groove, a beam length in a rolling vertical direction of the steel sheet of the laser may be 50 to 750 μm, and a beam width in the rolling vertical direction of the steel sheet of the laser may be 10 to 30 μm.

In the forming of the thermal shock portion, a beam length in a rolling vertical direction of the steel sheet of the laser may be 1000 to 15,000 μm, and a beam width in the rolling vertical direction of the steel sheet of the laser may be 80 to 300 μm.

The magnetic domain refining method of the grain-oriented electrical steel sheet may further include forming an insulation coating layer on a surface of the steel sheet.

After the forming of the groove, the forming of the insulation coating layer on the surface of the steel sheet may be performed.

After the forming of the insulation coating layer on the surface of the steel sheet, the forming of the thermal shock portion may be performed.

According to the embodiment of the present invention, by combining a permanent magnetic domain refining method and a temporary magnetic domain refining method, it is possible to improve iron loss and simultaneously reduce an amount of thermal shock.

According to the embodiment of the present invention, it is possible to refine a magnetic domain to a minimum size by combining a permanent magnetic domain refining method and a temporary magnetic domain refining method.

In addition, according to the embodiment of the present invention, by combining a permanent magnetic domain refining method and a temporary magnetic domain refining method, damage to an insulation coating layer may be minimized, so that it is possible to maximize corrosion resistance.

MODE FOR INVENTION

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Therefore, a first part, component, area, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as “including”, “having”, etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being “on” or “above” another part, it may be positioned directly on or above another part, or another part may be interposed therebetween. In contrast, when referring to a part being “directly above” another part, no other part is interposed therebetween.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Figure 1:
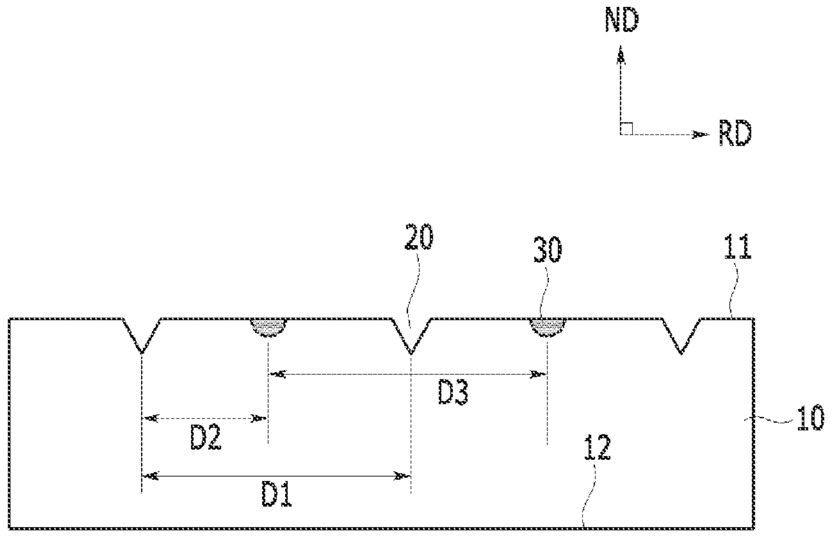
FIG. 1 illustrates a schematic view of a cross-section (TD surface) of a grain-oriented electrical steel sheet according to an embodiment of the present invention.
Figure 2:
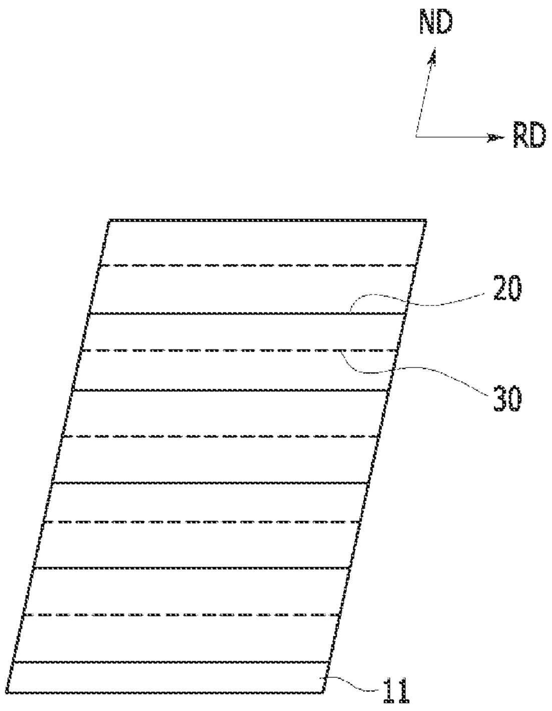
FIG. 2 illustrates a schematic view of a rolled surface (ND surface) of a grain-oriented electrical steel sheet according to an embodiment of the present invention.

FIG. 1 and FIG. 2 illustrate schematic views of a grain-oriented electrical steel sheet 10 that is magnetic-domain-refined by an embodiment of the present invention.

As shown in FIG. 1 and FIG. 2, the grain-oriented electrical steel sheet according to the embodiment of the present invention includes: a linear groove 20 formed in a direction crossing a rolling direction (RD direction) on one surface 11 or both surfaces 11 and 12 of the electrical steel sheet; and a linear thermal shock portion 30 formed in a direction crossing the rolling direction on one surface 11 or both surfaces 11 and 12 of the electrical steel sheet.

The groove 20 and the thermal shock portion 30 are formed in plural along the rolling direction, a distance D2 between the groove 20 and the thermal shock portion 30 is 0.2 to 0.5 times a distance D1 between the grooves 20, and a distance D3 between the thermal shock portions is 0.2 to 3.0 times the distance D1 between the grooves.

According to the embodiment of the present invention, by simultaneously forming the groove 20 and the thermal shock portion 30, the magnetic domain may be refined to a minimum size, and as a result, iron loss may be improved. When forming the groove 20 with a laser, energy is strong enough to generate iron powder, thus a temperature in the vicinity thereof increases very high. When the laser for forming the thermal shock portion 30 is irradiated in the vicinity, a peripheral portion of the groove 20 receives heat, and heat shrinkage occurs during cooling. Tensile stress acts on the steel sheet 10 due to the heat shrinkage. As a result, the tensile stress reduces a size of a magnetic domain. In addition, a free surface formed by the formation of the groove 20 generates a static magnetic energy surface charge to form a closed curve, and two effects by different mechanisms are simultaneously formed, while the iron loss is further reduced due to synergy of the two effects.

Particularly, it is possible to reduce the thermal shock due to the formation of a large amount of the thermal shock portion 30 by forming the groove 20, and it is possible to maximize the corrosion resistance by preventing damage to an insulation coating layer 50 by forming the thermal shock portion 30.

In FIG. 1, the distance between the grooves 20 is indicated by D1, the distance between the groove 20 and the thermal shock portion 30 is indicated by D2, and the distance between the thermal shock portions 30 is indicated by D3.

As shown in FIG. 1, when a plurality of grooves 20 and a plurality of thermal shock portions 30 are formed, a distance between an arbitrary groove and a groove 20 closest to the arbitrary groove 20 is defined as the distance D1 between the grooves. In addition, a distance between an arbitrary thermal shock portion 30 and a groove 20 closest to the arbitrary thermal shock portion 30 is defined as the distance D2 between the thermal shock portion and the groove. Further, a distance between an arbitrary thermal shock portion 30 and a thermal shock portion 30 closest to the arbitrary thermal shock portion 30 is defined as the distance D3 between the thermal shock portions.

In the embodiment of the present invention, since there are thicknesses of the groove 20 and the thermal shock portion 30 in the rolling direction (RD direction), the distances are defined based on center lines of the groove 20 and the thermal shock portion 30. In addition, in the embodiment of the present invention, the groove 20 and the thermal shock portion 30 are substantially parallel, but when they are not parallel, a distance between the nearest positions thereof is defined as the distance. In addition, when a plurality of grooves 20 and a plurality of thermal shock portions 30 are formed, an average value of respective distances D1, D2, and D3, that is, a value obtained by dividing a sum of the distances D1, D2, and D3 by the total number thereof may satisfy the aforementioned range.

The distance D2 between the groove 20 and the thermal shock portion is 0.2 to 0.5 times the distance D1 between the grooves 20. The distance D2 between the groove 20 and the thermal shock portion 30 may maximize an effect of improving iron loss by maximizing a density of a spike domain formed in a unit area by appropriately controlling the distance D1 between the grooves 20. More specifically, the distance D2 between the groove 20 and the thermal shock portion 30 is 0.22 to 0.3 times the distance D1 between the grooves 20.

FIG. 1 illustrates a case in which one thermal shock portion 30 is formed between the grooves 20, that is, a case in which D3/D1 is 1, but the present disclosure is not limited thereto. Specifically, the distance D3 between the thermal shock portions is 0.2 to 3.0 times the distance D1 between the grooves.

When the distance D3 between the thermal shock portions is too large, rather than an additional reduction effect of intended iron loss, it may be a factor that hinders reduction of iron loss by generating a non-intended magnetic domain (there is no formation of a spike magnetic domain that may smoothly move the magnetic domain). When the distance D3 between the thermal shock portions is too small, the effect of improving the iron loss may not be secured despite the ease of the movement of the magnetic domain due to the formation of the spike magnetic domains.

More specifically, the distance D1 between the grooves may be 2 to 15 mm, the distance D2 between the groove and the thermal shock portion may be 0.45 to 7.5 mm, and the distance D3 between the thermal shock portions may be 2.5 to 25 mm.

When the distances D1, D2, and D3 are too large, the spike magnetic domain that may smoothly move the magnetic domain is not formed, so that it may be a factor that hinders the reduction of the iron loss, rather than having an additional reduction effect of the intended iron loss. When the distances D1, D2, and D3 are too small, despite the ease of magnetic domain movement due to the formation of the spike magnetic domain, the heat-affected portion formed by laser irradiation is too large to secure the effect of improving the iron loss.

The distance D1 between the grooves and the distance D3 between the thermal shock portions may be constant within the entire electrical steel sheet. Specifically, the distance D1 between all the grooves and the distance D3 between all the thermal shock portions in the entire electrical steel sheet may correspond to within 10% of the average distance D1 between the grooves and the average distance D3 between the thermal shock portions. More specifically, they may correspond to within 1%.

FIG. 1 and FIG. 2 illustrate that the groove 20 and the thermal shock portion 30 are formed on one surface 11 of the steel sheet, but the present invention is not limited thereto.

Figure 3:
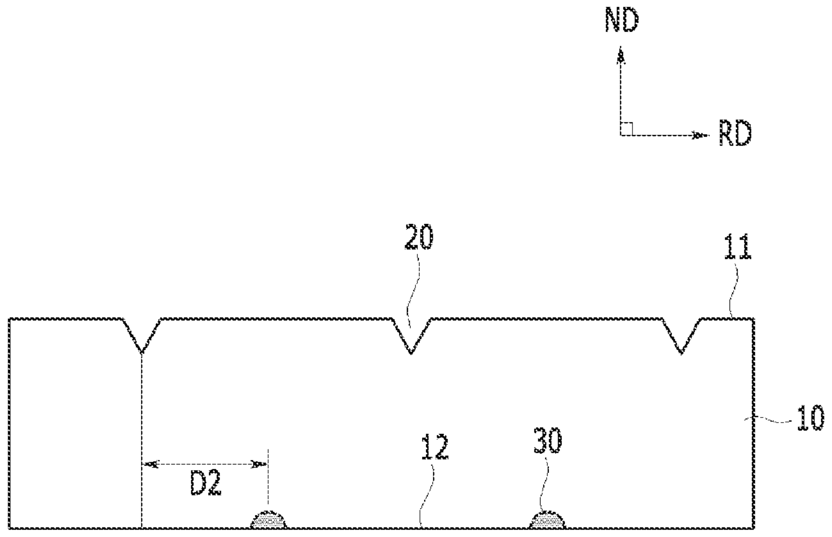
FIG. 3 illustrates a schematic view of a cross-section (TD surface) of a grain-oriented electrical steel sheet according to another embodiment of the present invention.

For example, as shown in FIG. 3, the groove may be formed on one surface 11 of the steel sheet, and the thermal shock portion 30 may be formed on the other surface 12 of the steel sheet. In this case, the distance D2 between the groove 20 and the thermal shock portion 30 is defined as the distance D2 between an imaginary line and the thermal shock portion 30 based on the imaginary line projected onto the other surface thereof by making the groove 20 symmetrical to the thickness center of the steel sheet. Except that the thermal shock portion 30 is formed on the other surface 12, since it is the same as described in the embodiment of the present invention, a duplicate description will be omitted.

FIG. 1 to FIG. 3 illustrate the case in which one thermal shock portion 30 is formed within the distance D1 between the grooves, that is, D3/D1 is about 1, but the present invention is not limited thereto.

Figure 4:
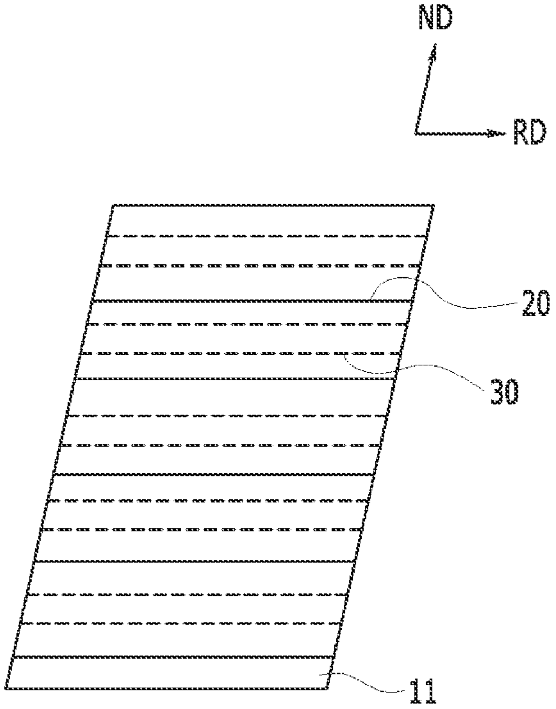
FIG. 4 illustrates a schematic view of a rolled surface (ND surface) of a grain-oriented electrical steel sheet according to another embodiment of the present invention.

For example, as shown in FIG. 4, a case in which D3/D1 is less than 1 is also possible. More specifically, the distance D3 between the thermal shock portions may be 0.2 to 0.5 times the distance D1 between the grooves. In this case, as described above, the average values of the distances D1 and D2 may satisfy the aforementioned range. More specifically, the distance D2 between the groove 20 and the thermal shock portion 30 may be 0.2 to 0.4 times the distance D1 between the grooves 20. For example, when four thermal shock portions 30 are formed within the distance D1 between the grooves (D3/D1 is 0.25), and each distance D2 is 0.25 times, 0.5 times, 0.25 times, and 0 times D1, the calculated average D2 is 0.25 times D1.

In addition, on the contrary, a case in which D3/D1 is larger than 1 is possible. More specifically, the distance D3 between the thermal shock portions may be 2 to 2.8 times the distance D1 between the grooves.

As shown in FIG. 1, the groove 20 means a portion of a surface of the steel sheet removed by laser irradiation. In FIG. 1, the shape of the groove 20 is illustrated as a wedge shape, but this is merely an example, and the groove may be formed in various shapes such as a quadrangular shape, a trapezoidal shape, a U-shape, a semi-circular shape, and a W-shape.

Figure 5:
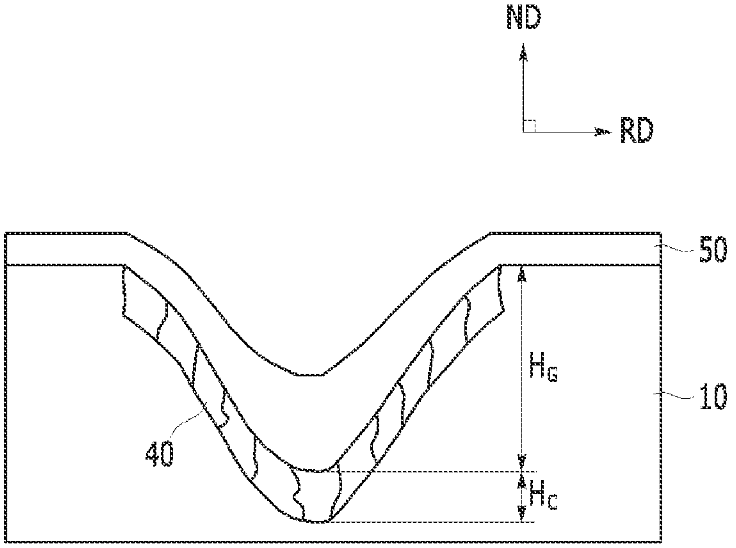
FIG. 5 illustrates a schematic view of a groove according to an embodiment of the present invention.

FIG. 5 illustrates a schematic view of the groove 20 according to the embodiment of the present invention. A depth ($H_G$) of groove 20 may be 3 to 5% of the thickness of the steel sheet. When the depth ($H_G$) of the groove is too shallow, it is difficult to obtain a proper iron loss improvement effect. When the depth ($H_G$) of the groove is too deep, texture characteristics of the steel sheet 10 are significantly changed due to strong laser irradiation, or a large amount of hill-up and spatter are formed, so that magnetic properties may be deteriorated. Therefore, it is possible to control the depth of the groove 20 in the above-described range.

As shown in FIG. 5, a solidified alloy layer 40 formed at a lower portion of the groove 20 may be included, and the solidified alloy layer 40 may have a thickness of 0.1 μm to 3 μm. By properly controlling the thickness of the solidified alloy layer 40, only spike domains are formed in the grooves after a final insulation coating without affecting secondary recrystallization formation. When the thickness of the solidified alloy layer 40 is too thick, it affects the recrystallization during the first recrystallization, so the Goss integration degree of the secondary recrystallization after the secondary recrystallization annealing is decreased, so even if the secondary recrystallized steel sheet is irradiated with a laser, iron loss improvement effect characteristics may not be secured. The solidified alloy layer contains recrystallization with an average grain diameter of 1 to 10 μm, and is distinguished from other parts of the steel sheet.

As shown in FIG. 5, the insulation coating layer 50 may be formed on the groove 20.

FIG. 2 and FIG. 4 illustrate that the length direction and the rolling direction (RD direction) of the groove 20 and the thermal shock portion 30 form a right angle, but the present invention are not limited thereto. For example, the length direction and the rolling direction of the groove 20 and the thermal shock portion 30 may form an angle of 75 to 88°. When forming the above-described angle, it may contribute to improving the iron loss of the grain-oriented electrical steel sheet.

FIG. 2 and FIG. 4 illustrate that the groove 20 and the thermal shock portion 30 are continuously formed along the rolling vertical direction (TD direction), but the present invention is not limited thereto. For example, the groove 20 and the thermal shock portion 30 may be intermittently formed at 2 to 10 along the rolling vertical direction (TD direction) of the steel sheet. As described above, when they are intermittently formed, they may contribute to improving the iron loss of the grain-oriented electrical steel sheet.

Unlike the groove 20, the thermal shock portion 30 is indistinguishable from other surfaces of the steel sheet. The thermal shock portion 30 is a portion that is etched in a form of a groove when immersed in hydrochloric acid at a concentration of 5% or more for 10 minutes or more, and may be distinguished from other surface portions of the steel sheet. Alternatively, the thermal shock portion 30 may be distinguished in that it has a difference in Vickers hardness (HV) of 10 to 120 from the surface of the steel sheet in which the groove 20 or the thermal shock portion 30 is not formed. In this case, the hardness measurement method thereof may measure the hardness of the thermal shock portion and a portion not subjected to thermal shock with micro-hardness by a nanoindenter. That is, it means nano Vickers hardness (HV).

The magnetic domain refining method of the grain-oriented electrical steel sheet according to the embodiment of the present invention includes: preparing the grain-oriented electrical steel sheet 10: forming the groove 20 by irradiating a laser on one surface or both surfaces of the grain-oriented electrical steel sheet 10 in a direction crossing the rolling direction (RD direction); and forming the thermal shock portion 30 by irradiating a laser on one surface or both surfaces of the grain-oriented electrical steel sheet 10 in a direction crossing the rolling direction (RD direction).

First, the grain-oriented electrical steel sheet 10 is prepared. The magnetic domain refining method according to the embodiment of the present invention has features in shapes of the groove 20 and the thermal shock portion 30, thus the grain-oriented electrical steel sheet for the magnetic domain refining may be used without limitation. Particularly, an effect of the present invention is realized regardless of an alloy composition of the grain-oriented electrical steel sheet. Therefore, a detailed description of the alloy composition of the grain-oriented electrical steel sheet will be omitted.

In the embodiment of the present invention, as the grain-oriented electrical steel sheet, a grain-oriented electrical steel sheet rolled with a predetermined thickness through hot rolling and cold rolling from a slab, may be used.

Next, one surface 11 of the grain-oriented electrical steel sheet is irradiated with a laser in a direction crossing the rolling direction (RD direction) to form the groove 20.

In this case, energy density (Ed) of the laser may be 0.5 to 2 $J/mm^2$. When the energy density is too small, the groove 20 having an appropriate depth is not formed, and thus it is difficult to obtain an effect of ameliorating iron loss. In contrast, even when the energy density is too large, the groove 20 having too large a depth is formed, and thus it is difficult to obtain an effect of ameliorating iron loss.

Figure 6:
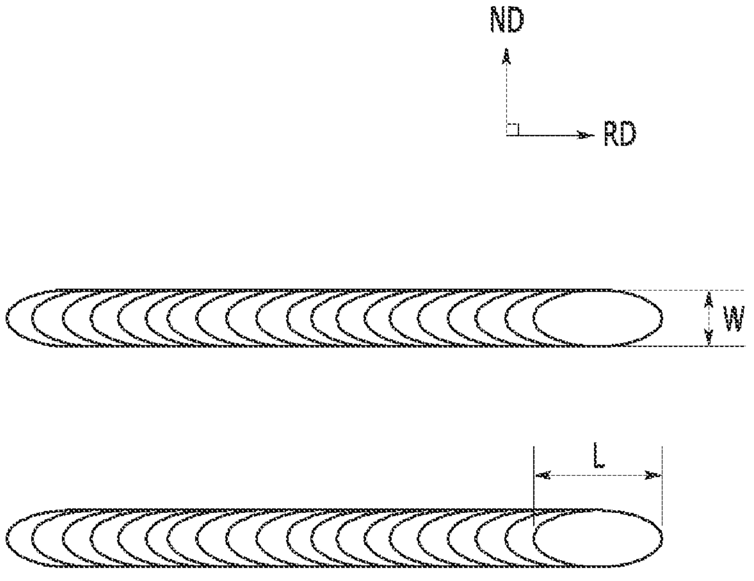
FIG. 6 illustrates a schematic view of a shape of a laser beam according to an embodiment of the present invention.

FIG. 6 shows a schematic diagram of a shape of a laser beam. In the forming of the groove, a beam length L of the laser in a rolling vertical direction (TD direction) of the steel sheet may be 50 to 750 μm. When the beam length L in the rolling vertical direction (TD direction) is too short, a time during which the laser is irradiated is too short, so that an appropriate groove may not be formed, and it is difficult to obtain an effect of ameliorating iron loss. In contrast, when the beam length L in the rolling vertical direction (TD direction) is too long, a time during which the laser is irradiated is too long, so that the groove 20 having too large a depth is formed, and it is difficult to obtain an effect of ameliorating iron loss.

A beam width W of the laser in the rolling direction (RD direction) of the steel sheet may be 10 to 30 μm. When the beam width W is too short or long, a width of the groove 20 may be short or long, and thus an appropriate magnetic domain refining effect may not be obtained.

FIG. 6 illustrates that the shape of the beam is elliptical, but the shape thereof may be spherical or rectangular, and is not limited thereto.

As a laser, a laser with 1 kW to 100 kW power may be used, and a laser of a Gaussian Mode, a Single Mode, and a Fundamental Gaussian Mode may be used. It is a TEMoo-shaped beam, and an M2 value may have a value ranging from 1.0 to 1.2.

Next, the thermal shock portion 30 is formed, by irradiating a laser on one surface or both surfaces of the grain-oriented electrical steel sheet 10 in a direction crossing the rolling direction (RD direction).

The forming of the groove 20 and the forming of the thermal shock portion 30 described above may be performed without limitation before and after the time. Specifically, after the forming of the groove 20, the thermal shock portion 30 may be formed. In addition, after the forming of the thermal shock portion 30, the groove 20 may be formed. In addition, it is possible to simultaneously form the groove 20 and the thermal shock portion 30.

In the forming of the thermal shock portion 30, the energy density (Ed) of the laser may be 0.02 to 0.2 J/mm$^2$. When the energy density is too small, an appropriate thermal shock portion 30 is not formed, and thus it is difficult to obtain an effect of ameliorating iron loss. In contrast, when the energy density is too large, a surface of the steel sheet is damaged, and thus it is difficult to obtain an effect of ameliorating iron loss.

In the forming of the thermal shock portion 30, the beam length L of the laser in the rolling vertical direction (TD direction) of the steel sheet may be 1000 to 15,000 μm, and the beam width W of the laser in the rolling direction (RD direction) of the steel sheet may be 80 to 300 μm.

Since the shapes of the groove 20 and the thermal shock portion 30 are the same as those described above, a redundant description thereof will be omitted.

The magnetic domain refining method of the grain-oriented electrical steel sheet according to the embodiment of the present invention may further include forming an insulation coating layer. The forming of the insulation coating layer may be included after the preparing of the grain-oriented electrical steel sheet, after the forming of the groove, or after the forming of the thermal shock portion. More specifically, it may be included after the forming of the groove. When the insulation coating layer is formed after the forming of the groove, there is an advantage in that the insulating coating may be performed only once. After the insulation coating layer is formed, the forming of the thermal shock portion may be performed. In the case of the thermal shock portion, since damage is not applied to the insulation coating layer, damage to the insulation coating layer is minimized, thereby maximizing corrosion resistance.

A method of forming the insulation coating layer may be used without particular limitation, and for example, the insulation coating layer may be formed by applying an insulation coating solution containing a phosphate. It is preferable to use a coating solution containing colloidal silica and a metal phosphate as the insulating coating solution. In this case, the metal phosphate may be Al phosphate, Mg phosphate, or a combination thereof, and a content of Al, Mg, or a combination may be 15 wt % or more with respect to a weight of the insulating coating solution.

Hereinafter, the present invention will be described in more detail through examples. However, the examples are only for illustrating the present invention, and the present invention is not limited thereto.

Experimental Example 1: Distance of Groove and Thermal Shock Portion

The grain-oriented electrical steel sheet cold-rolled with a thickness of 0.30 mm was prepared. This electrical steel sheet was irradiated with a 1.0 kW Gaussian mode continuous wave laser to form 86° angled grooves with the RD direction. A width W of the laser beam was 20 μm, and a length L of the laser beam was 600 μm. Energy density of the laser was 1.5 J/mm$^2$, and a depth of the groove was 12 μm.

The grooves were formed at the distance D1 between the grooves shown in Table 1 below, and the insulation film was formed.

Then, a 1.0 kW Gaussian mode continuous wave laser was irradiated on the electrical steel sheet to form the thermal shock portion. The width W of the laser beam was 200 μm, and the length L of the laser beam was 10,000 μm. The energy density of the laser was 0.16 J/mm$^2$.

The thermal shock portions were formed with the distance D2 between the groove and the thermal shock portion and the distance D3 between the thermal shock portions summarized in Table 1 below, and these are summarized in Table 1.

In Table 1 below, the iron loss amelioration rate and the magnetic flux density deterioration rate are shown. The iron loss amelioration rate was calculated as $(W_1-W_2)/W_1$ by measuring iron loss $W_1$ of the electric steel sheet after the groove was formed by irradiating the laser and iron loss $W_2$ of the electric steel sheet after the thermal shock portion was formed by irradiating the laser. The magnetic flux density deterioration rate was calculated as $(W_1-W_2)/W_1$ by measuring a magnetic flux density $B_1$ of the electric steel sheet after the groove was formed by irradiating the laser and a magnetic flux density $B_2$ of the electric steel sheet after the thermal shock portion was formed by irradiating the laser. The iron loss was measured as the iron loss value ($W_{17/50}$) at a frequency of 50 Hz when the magnetic flux density was 1.7 Tesla. The magnetic flux density was measured as the magnetic flux density value $B_8$ at a magnetizing force of 800 A/m.

TABLE 1

| | Distance between grooves (D1, mm) | Distance between groove and thermal shock portion (D2, mm) | Distance between thermal shock portions (D3, mm) | D2/D1 (average) | D3/D1 (average) | Iron loss amelioration rate (%) | Magnetic flux density deterioration rate (%) |
|---|---|---|---|---|---|---|---|
| Embodiment 1 | 2 | 0.52 | 5.6 | 0.26 | 2.8 | 8.5 | 0 |
| Embodiment 2 | 4 | 1.04 | 11.2 | 0.26 | 2.8 | 7.5 | 0 |
| Embodiment 3 | 6 | 1.48 | 16.8 | 0.26 | 2.8 | 7.0 | 0 |
| Embodiment 4 | 8 | 2 | 20.4 | 0.25 | 2.55 | 5.6 | 0 |
| Embodiment 5 | 10 | 2.5 | 22.3 | 0.25 | 2.23 | 3.6 | 0 |
| Embodiment 6 | 10 | 2.5 | 11.8 | 0.25 | 1.18 | 4.2 | 0 |
| Embodiment 7 | 10 | 2.5 | 11.3 | 0.25 | 1.13 | 4.6 | 0 |
| Embodiment 8 | 10 | 2.6 | 8.0 | 0.26 | 0.8 | 4.9 | 0 |
| Comparative 1 Example 1 | 10 | None | None | None | None | 0.0 | 0 |
| Comparative Example 2 | 10 | 1.5 | 10 | 0.15 | 1.0 | −1.2 | 1.5 |
| Comparative Example 3 | 10 | 2.5 | 35 | 0.25 | 3.5 | −0.5 | −1.3 |

As shown in Table 1, it can be seen that Comparative Example t in which the thermal shock portion is not formed and Comparative Example 2 in which D2/D1 is 0.15 are inferior compared with the embodiments in the iron loss improvement rate and the magnetic flux density deterioration rate.

Experimental Example 2: When D3/D1 is 0.5 or Less

It was performed in the same manner as in Experimental Example 1, but a plurality of thermal shock lines were formed between the grooves so that D3/D1 was 0.5 or less. The distance D1 between the grooves was fixed at 10 mm.

As shown in Table 2, it can be seen that when D3/D1 is 0.2 to 0.4, the iron loss improvement rate and magnetic flux density deterioration rate are improved compared with the case in which D3/D1 is 0.5.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the abovedescribed exemplary embodiments are for illustrative purposes only, and the scope of the present invention is not limited thereto.

TABLE 2

| | Distance between thermal shock portions (D3, mm) | Distance between groove and first thermal shock portion (D2, mm) | Distance between groove and second thermal shock portion (D2, mm) | Distance between groove and third thermal shock portion (D2, mm) | Distance between groove and fourth thermal shock portion (D2, mm) | D2/D1 (average) | Iron loss amelioration rate (%) | Magnetic flux density degradation rate (%) |
|---|---|---|---|---|---|---|---|---|
| Embodiment 9 | 5.0 | 5.0 | 0 | — | — | 0.25 | 5.5 | 0 |
| Embodiment 10 | 3.33 | 3.33 | 3.33 | 0 | — | 0.22 | 6.5 | 0 |
| Embodiment 11 | 2.5 | 2.5 | 5.0 | 2.5 | 0 | 0.25 | 7.5 | 0 |

DESCRIPTION OF SYMBOLS

10: grain-oriented electrical steel sheet
11: one surface of steel sheet
12: other surface of steel sheet
20: groove
30: thermal shock portion
40: solidified alloy layer
50: insulation coating layer

The invention claimed is:

1. A grain-oriented electrical steel sheet, comprising:
a linear groove formed in a direction crossing a rolling direction on one surface or both surfaces of an electrical steel sheet;
a linear thermal shock portion formed in the direction crossing the rolling direction on one surface or both surfaces of the electrical steel sheet; and
the groove and the thermal shock portion are substantially parallel,
wherein the groove and the thermal shock portion are formed in plural along the rolling direction,
at least one distance D2 between nearest two of the groove and the thermal shock portion is 0.22 to 0.3 times a distance D1 between the grooves,
the thermal shock portion has a difference in Vickers hardness (HV) of 10 to 120 from a surface of the steel sheet in which the thermal shock portion is not formed,
a solidified alloy layer formed at a lower portion of the groove is included, and the solidified alloy layer has a thickness of 0.1 μm to 3 μm, and
at least one distance D3 between nearest two of the thermal shock portions is 0.2 to 0.4 times the distance D1 between the grooves.

2. The grain-oriented electrical steel sheet of claim 1, wherein
the distance D1 between the grooves is 2 mm to 15 mm.

3. The grain-oriented electrical steel sheet of claim 1, wherein
the groove and the thermal shock portion are formed on one surface of the steel sheet.

4. The grain-oriented electrical steel sheet of claim 1, wherein
the groove is formed on one surface of the steel sheet, and the thermal shock portion is formed on the other surface of the steel sheet.

5. The grain-oriented electrical steel sheet of claim 1, wherein
a depth of the groove is 3 to 5% of a thickness of the steel sheet.

6. The grain-oriented electrical steel sheet of claim 1, wherein
a length direction and the rolling direction of the groove and the thermal shock portion form an angle of 75 to 88°.

7. The grain-oriented electrical steel sheet of claim 1, wherein
the groove and the thermal shock portion are intermittently formed at 2 to 10 along a rolling vertical direction of the steel sheet.

8. The grain-oriented electrical steel sheet of claim 1, wherein the grain-oriented electrical steel sheet further comprises an insulation coating layer formed at an upper portion of the groove.

9. The grain-oriented electrical steel sheet of claim 1, wherein the grain-oriented electrical steel sheet has an iron loss amelioration rate from 3.6 to 8.5 calculated as $(W_1-W_2)/W_1$ by measuring iron loss $W_1$ of the electric steel sheet after the groove was formed by irradiating the laser and iron loss $W_2$ of the electric steel sheet after the thermal shock portion is formed by the irradiating the laser.

10. The grain-oriented electrical steel sheet of claim 1, wherein the grain-oriented electrical steel sheet has a magnetic flux density deterioration rate of 0 calculated as $(B_1-B_2)/B_1$ by measuring a magnetic flux density $B_1$ of the electric steel sheet after the groove was formed by irradiating the laser and a magnetic flux density $B_2$ of the electric steel sheet after the thermal shock portion was formed by irradiating the laser.

* * * * *